UNITED STATES PATENT OFFICE.

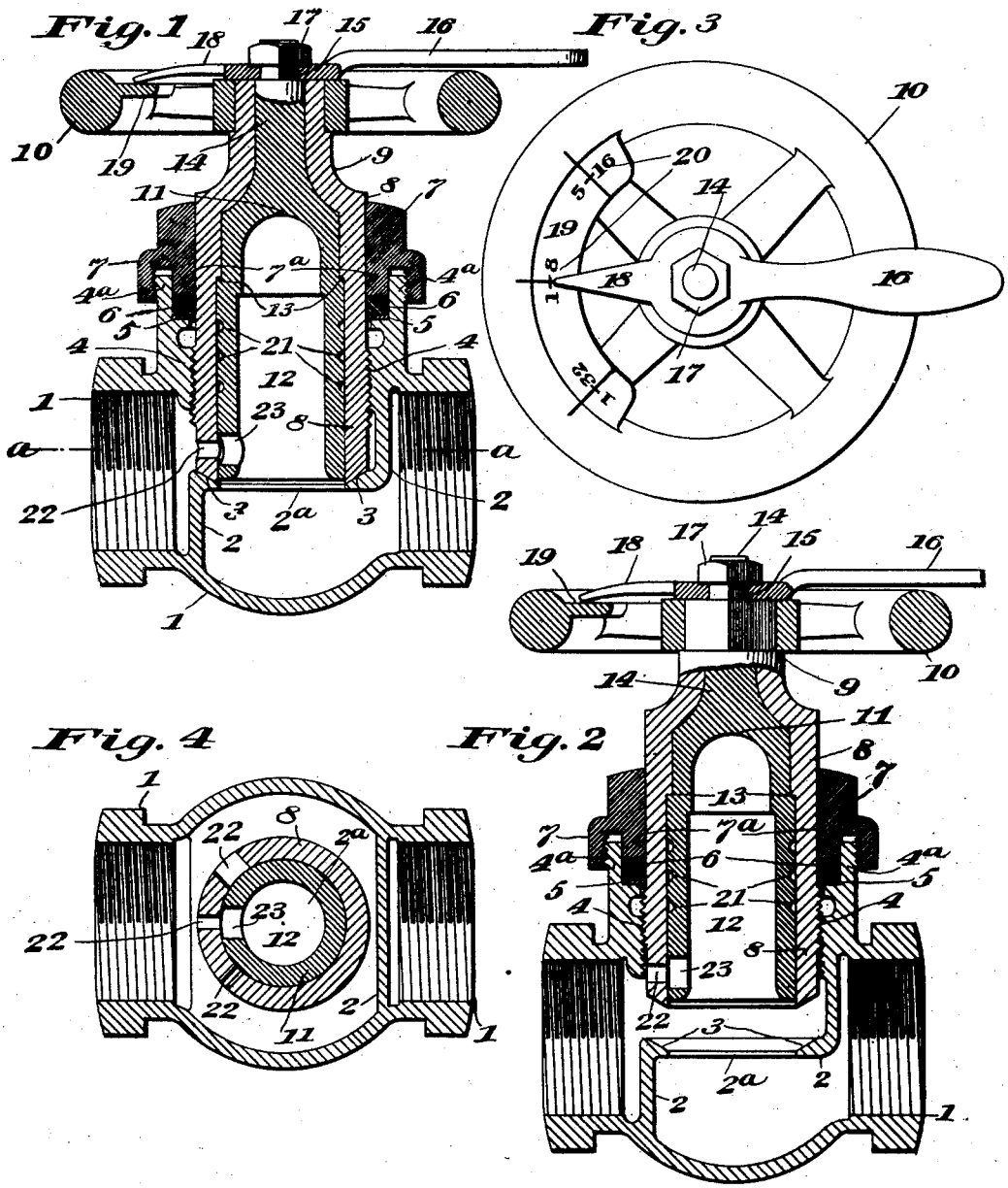

WASHINGTON MEREDITH, OF CINCINNATI, OHIO, ASSIGNOR OF ONE-HALF TO DANIEL G. COPPIN, OF NEWPORT, KENTUCKY.

VALVE.

SPECIFICATION forming part of Letters Patent No. 715,108, dated December 2, 1902.

Application filed March 13, 1902. Serial No. 98,031. (No model.)

*To all whom it may concern:*

Be it known that I, WASHINGTON MEREDITH, a citizen of the United States of America, and a resident of Cincinnati, in the county of Hamilton and State of Ohio, have invented certain new and useful Improvements in Valves, of which the following is a specification.

This invention relates to certain improvements in valves, and has for its object to provide a valve of a simple and inexpensive nature and of a light and durable construction and having means for balancing the pressures upon opposite sides of the valve, whereby the improved valve is especially adapted for controlling fluids under considerable pressure.

The invention consists in certain novel features of the construction and combinations and arrangements of the various parts of the improved valve, whereby certain important advantages are attained and the device is made simpler, cheaper, and is otherwise better adapted and made more convenient for use than various other forms of valve heretofore employed, all as will be hereinafter fully set forth.

The novel features of the invention will be carefully defined in the claims.

In the accompanying drawings, which serve to illustrate my improvements, Figure 1 is an axial section taken through a valve constructed according to my invention and showing one position of the parts of said valve. Fig. 2 is a view similar to Fig. 1, but showing the parts of the valve in another position, the main valve being raised from its seat. Fig. 3 is a plan view showing the index device for indicating the position of the auxiliary valve with relation to the main valve. Fig. 4 is a sectional view taken transversely through the improved valve in the plane indicated by line *a a* in Fig. 1 and showing the arrangement of the ports for the auxiliary valve.

As shown in the views, 1 indicates the casing or body portion of the valve, which is constructed in the form common for globe-valves, being provided with a partition 2, extended across its interior, and provided with a port 2$^a$ and with a valve-seat 3, surrounding said port in the ordinary way. The upper part of the casing is provided with a screw-threaded bore or opening 4 and with a boss 4$^a$, extended around and above said opening and provided at its upper part with exterior screw-threads, with which are engaged corresponding screw-threads formed on the inner side of a skirt depending from a cap 7, the upper part of which is made hexagonal in shape to receive a wrench or other tool, whereby the cap may be conveniently turned. In the upper part of the boss 4$^a$ is formed an annular chamber adapted to receive a packing 6, and beneath said packing is held a metal ring or washer 5, and the cap 7 is provided with an internal downwardly-directed annular flange 7$^a$, which is engaged within the chamber of the boss 4$^a$ in such a way as to press tightly upon the upper surface of the packing 6, held within said chamber.

8 indicates the main valve, which is constructed in the form of a hollow cylindrical plug or barrel, the lower end or edge of which is adapted for contact upon the annular valve-seat 3 in the casing. At its central portion the main valve 8 is formed with external screw-threads adapted for engagement with the interior screw-threads of the bore 4 of the casing, and the upper part of said valve is extended up through the cap 7 and above the same, its upper extremity being made in reduced diameter, as shown at 9 in Figs. 1 and 2, and being formed with a square, upon which is held a hand-wheel 10, by means of which said main valve may be turned in a well-known way. The packing 6, as will be obvious, prevents leakage from the interior of the casing around the said main valve, since when the cap 7 is screwed down upon the boss 4$^a$ of the casing said packing is caused to press tightly upon the sides of the main valve.

Within the interior recess or chamber of the main valve 8 is arranged the auxiliary valve 11, also constructed in the form of a hollow cylindrical plug or barrel, the exterior diameter of which corresponds with the diameter of the recess or chamber within the main valve and the interior recess or chamber 12 of said auxiliary valve 11 being at all times open for communication at its lower end with the port 2ª in the valve-casing 1. The upper extremity 14 of the auxiliary valve 11 is made in reduced diameter in order that it may be passed through the interior recess or chamber of the reduced upper portion 9 of the main valve, which recess or chamber is of course also of reduced diameter, and above the hand-wheel 10 the said upper extremity 14 of the auxiliary valve is formed with a square 15, on which is held an operating lever or handle 16, a nut 17 being provided for holding said lever in position for turning the said auxiliary valve. One end 18 of the said lever or handle is formed into an index or pointer, which is adapted as the auxiliary valve 11 is turned relatively to the main valve to traverse a segmental surface 19 upon the hand-wheel, upon which surface are graduations 20, suitably arranged, as shown in Fig. 3, for indicating the relative positions of the two valves.

The upper reduced extremity of the auxiliary valve 11 is preferably made solid, as shown in Fig. 1, and upon the cylindrical body portion of said auxiliary valve is formed an annular shoulder 13, adapted for engagement with a corresponding shoulder formed in the recess or chamber of the main valve, the auxiliary valve being upheld with its shoulder flush upon the shoulder of the main valve by the upward pressure of the fluid from the port of the casing within the recess or chamber of said auxiliary valve to prevent any leakage between the two valves and also to prevent binding of the auxiliary valve within the recess or chamber of the main valve. Below its said shoulder 13 the auxiliary valve 11 is also formed with a series of superficial grooves 21 to produce a packing in a well-known way for insuring against leakage between the two valves.

In the lower part of the wall of the main valve 8 and below the screw-threads upon the same are formed a series of openings 22 of graduated sizes, with each of which is adapted for registry an opening 23, formed in the lower portion of the wall of the auxiliary valve, the openings 22 and 23 when in registry being adapted for the passage of the fluid from the interior recess or chamber 12 of the auxiliary valve 11, which is open to the port 2ª of the valve-casing through both the main and auxiliary valves, as will be readily understood. The marks or index characters 20 upon the segmental surface 19 of the hand-wheel 10 correspond in arrangement with the openings or ports 22 in the wall of the main valve 8, and the index or pointer 18, held upon the upper end of the auxiliary valve, is arranged to correspond in position with the port or opening 23 in the wall of said auxiliary valve, so that when the auxiliary valve 11 is turned by means of its handle or lever 16 until the index 18 comes opposite one of the graduations or characters 20 upon the hand-wheel the port 23 of the auxiliary valve 11 will be in registry with that one of the ports or openings 22 of the main valve with which such index character or graduation 20 corresponds.

In the operation of the improved valve when it is desired to permit a small volume only of the fluid to pass the improved valve the main valve 8 will be permitted to rest upon its seat, and the auxiliary valve 11 will be operated to bring the port or opening 23 therein into registry with one or the other of the openings 22 in the main valve, so that but a slight volume, corresponding with the diameter of the particular opening 22 with which the opening 23 is in registry, will be permitted to pass the valve. In this way cracking of the valve-seat 3 or other damage such as commonly results in ordinary valves from the passage of the fluid under high pressure under a slightly-opened valve is altogether prevented, and the life of the valve is greatly increased.

When it is desired to supply the fluid in greater volume than can be passed through the ports or openings of the valves 8 and 11, the main valve 8 is itself raised by turning the hand-wheel 10 to permit the fluid to issue freely from the port 2ª of the valve-casing, the main valve being at this time raised so high as to give a free exit to the fluid from said port of the casing, so that damage of the valve-seat or other part is prevented.

By the manipulation of the auxiliary valve not only may the fluid under pressure be permitted to pass the valve in regulated volumes when but small volumes are required for use, but also said auxiliary valve may be manipulated prior to the opening of the main valve in such a way as to permit of balancing the pressures upon opposite sides of the valve, so as to permit the main valve to be more readily and easily opened. This is a great advantage, and more especially is this true in large valves employed for controlling fluids under considerable pressures, which as ordinarily constructed require considerable power for their operation.

One of the ports 22 in the main valve 8 will preferably be of very small diameter, so as to permit but very slight flow of the fluid past the valve, so as to be capable of use when the valve is employed upon steam-pipes to prevent condensation, such as commonly occurs from cooling after the valve is closed. By leaving this small port open such condensation is effectually prevented, and accidents such as are commonly caused by the admission of steam to pipes containing cold water are obviated.

The valve constructed according to my invention is of an extremely simple and inexpensive nature and is especially well adapted for use by reason of its strength and durability and also on account of the ease with which it may be operated and the nicety with which the flow of the fluid past it may be regulated. It will also be obvious from the above description that the device is capable of some modification without material departure from the principles and spirit of the invention, and for this reason I do not wish to be understood as limiting myself to the precise form and arrangements of the several parts as herein set forth; nor do I wish to be understood as limiting myself to the employment of my improvements in connection with a valve of any particular type nor for any special use, since it is evident the invention is capable of adaptation to valves of different kinds and designed for different purposes.

Having thus described my invention, what I claim, and desire to secure by Letters Patent, is—

1. In a valve, the combination of a casing having a port, a valve mounted for movement and adapted to close said port in the casing and itself provided with a port and another valve mounted for movement and adapted to close the port of the first-named valve, one of said valves being mounted for longitudinal movement and the other for rotative movement with respect to the part in which the corresponding port is formed, substantially as set forth.

2. In a valve, the combination of a casing having a port and provided with a valve-seat surrounding said port, a main valve mounted for endwise movement in the casing and adapted to close said port and also provided with a port formed in it and an auxiliary valve mounted to turn relatively to the main valve and arranged to control the port thereof, substantially as set forth.

3. In a valve, the combination of a casing having a port and provided with a valve-seat surrounding said port, a cylindrical main valve having a recess or chamber and mounted for rotative and endwise movement in the casing with its lower edge adapted for contact with said valve-seat and the wall of its recess or chamber formed with a port, a cylindrical auxiliary valve also provided with a recess or chamber and fitting and held to turn within the recess or chamber of the main valve with its recess or chamber adapted for communication with the port of the casing and its wall provided with a port for registry with the port of the said main valve, and means for turning said auxiliary valve independently of the main valve to bring the ports of the valves in registry, substantially as set forth.

4. In a valve, the combination of a casing having a port and provided with a valve-seat surrounding said port, a cylindrical main valve having a recess or chamber and mounted for rotative and endwise movement in the casing with its lower edge adapted for contact with said valve-seat and the wall of its recess or chamber formed with a port, a cylindrical auxiliary valve also having a recess or chamber and fitting and held to turn in the recess or chamber of said main valve with its recess or chamber adapted for communication with the port of the casing and its wall provided with a port for registry with the port of the main valve, a hand-wheel carried upon the upper end of the main valve for moving the same and a lever connected with the auxiliary valve for moving the same independently of the movement of the main valve, substantially as set forth.

5. In a valve, the combination of a casing having a port and provided with a valve-seat surrounding said port, a cylindrical main valve having a recess or chamber and mounted for rotative and endwise movement in the casing with its lower edge adapted for contact with the valve-seat of said casing and the wall of its recess or chamber formed with a port, a cylindrical auxiliary valve also having a recess or chamber and fitting and held to turn in the recess or chamber of said main valve with its upper end extended above the upper end of said main valve and its recess or chamber adapted for communication with the port of the casing, the wall of the auxiliary valve being formed with a port for registry with the port of the main valve, a hand-wheel carried on the upper end of the main valve, a lever carried on the upper end of the auxiliary valve and devices connected with the hand-wheel and lever for indicating the positions of the two valves, substantially as set forth.

Signed at Cincinnati, Ohio, this 8th day of March, 1902.

WASHINGTON MEREDITH.

Witnesses:
DANIEL G. COPPIN,
JOHN ELIAS JONES.